(12) United States Patent
Caimano et al.

(10) Patent No.: US 11,236,674 B2
(45) Date of Patent: Feb. 1, 2022

(54) ADDITIVELY MANUFACTURED HEAT EXCHANGER

(71) Applicant: GE Avio Srl, Rivalta di Torino (IT)

(72) Inventors: Antonio Caimano, Turin (IT); Antonio Cardillo, Rende (IT); Ivan Fanelli, Castellana Grotte (IT)

(73) Assignee: GE AVIO S.R.L., Rivalta di Torino (IT)

( * ) Notice: Subject to any disclaimer, the term of this patent is extended or adjusted under 35 U.S.C. 154(b) by 457 days.

(21) Appl. No.: 15/976,206

(22) Filed: May 10, 2018

(65) Prior Publication Data

US 2018/0347468 A1    Dec. 6, 2018

(30) Foreign Application Priority Data

Jun. 6, 2017   (EP) .................................... 17425060

(51) Int. Cl.
*F02C 7/18*        (2006.01)
*F28F 9/02*        (2006.01)
(Continued)

(52) U.S. Cl.
CPC .............. *F02C 7/185* (2013.01); *F02C 6/206* (2013.01); *F02C 7/12* (2013.01); *F02C 9/18* (2013.01);
(Continued)

(58) Field of Classification Search
CPC .. F02C 7/185; F02C 6/206; F02C 7/12; F02C 9/18; F02K 3/06; F28D 7/1615;
(Continued)

(56) References Cited

U.S. PATENT DOCUMENTS

| 4,722,666 A | 2/1988 | Dennison et al. |
| 5,048,286 A * | 9/1991 | Stransky ................. F02K 3/075 60/226.3 |

(Continued)

FOREIGN PATENT DOCUMENTS

| CN | 105525992 A | 4/2016 |
| CN | 105525994 A | 4/2016 |

(Continued)

OTHER PUBLICATIONS

European Search Report Corresponding to EP174250605 dated Nov. 15, 2017.

(Continued)

*Primary Examiner* — Tho V Duong
*Assistant Examiner* — Raheena R Malik
(74) *Attorney, Agent, or Firm* — Dority & Manning, P.A.

(57) ABSTRACT

A heat exchanger for cooling a component is coupled with a cowl at least partially surrounding the component. The cowl defines a cowl plenum and a peripheral gap for receiving the heat exchanger. The heat exchanger includes a housing defining a heat exchange plenum for receiving a cool fluid stream and a plurality of heat exchange tubes passing through the heat exchange plenum for receiving a hot fluid stream. A discharge manifold defines a discharge plenum that provides fluid communication between the heat exchange plenum and the cowl plenum through a fluid outlet. In addition, an impingement baffle at least partially defines the discharge manifold and defines a plurality of cooling holes for impinging cooling air on the component proximate the heat exchanger.

19 Claims, 10 Drawing Sheets

(51) Int. Cl.
*F28F 13/12* (2006.01)
*F02K 3/06* (2006.01)
*F28F 3/12* (2006.01)
*F02C 7/12* (2006.01)
*F28D 7/16* (2006.01)
*F02C 6/20* (2006.01)
*F02C 9/18* (2006.01)
*F28D 21/00* (2006.01)

(52) U.S. Cl.
CPC .............. *F02K 3/06* (2013.01); *F28D 7/1615* (2013.01); *F28F 3/12* (2013.01); *F28F 9/0265* (2013.01); *F28F 13/12* (2013.01); F05D 2220/324 (2013.01); F05D 2230/53 (2013.01); F05D 2260/201 (2013.01); F05D 2260/213 (2013.01); F28D 2021/0021 (2013.01); F28F 2009/0287 (2013.01)

(58) Field of Classification Search
CPC ... F28D 2021/0021; F28F 3/12; F28F 9/0265; F28F 13/12; F28F 2009/0287
USPC ........................................................ 165/164
See application file for complete search history.

(56) References Cited

U.S. PATENT DOCUMENTS

| | | | | |
|---|---|---|---|---|
| 5,113,649 A | * | 5/1992 | Siedlecki, Jr. | F02C 7/18 60/226.3 |
| 5,123,242 A | * | 6/1992 | Miller | F02C 6/08 60/226.1 |
| 5,182,905 A | * | 2/1993 | Stransky | F02C 9/18 60/204 |
| 5,273,106 A | * | 12/1993 | Drake | F28D 9/0012 165/164 |
| 5,832,992 A | * | 11/1998 | Van Andel | B23P 15/26 165/165 |
| 6,134,880 A | * | 10/2000 | Yoshinaka | F28D 7/00 60/226.1 |
| 6,311,676 B1 | * | 11/2001 | Oberg | F02B 29/0462 123/563 |
| 7,648,686 B2 | * | 1/2010 | Reinke | B01J 12/007 422/198 |
| 7,810,552 B2 | * | 10/2010 | Slaughter | F28F 7/02 165/148 |
| 8,051,952 B2 | | 11/2011 | Bart et al. | |
| 8,418,753 B2 | * | 4/2013 | Hirokawa | B21D 28/28 165/177 |
| 8,757,248 B2 | * | 6/2014 | Postma | F28F 1/16 165/164 |
| 8,851,156 B2 | * | 10/2014 | Semmes | F28D 1/05316 165/134.1 |
| 9,394,803 B2 | | 7/2016 | Suciu et al. | |
| 2005/0268612 A1 | | 12/2005 | Rolt | |
| 2008/0238651 A1 | | 10/2008 | Kucharyson | |
| 2013/0186102 A1 | | 7/2013 | Lo | |
| 2014/0360698 A1 | | 12/2014 | Waldman et al. | |
| 2015/0226433 A1 | | 8/2015 | Dudebout et al. | |
| 2016/0017810 A1 | | 1/2016 | Lord et al. | |
| 2016/0108813 A1 | | 4/2016 | Schmitz | |
| 2016/0108814 A1 | | 4/2016 | Schmitz | |
| 2016/0114439 A1 | | 4/2016 | Pal et al. | |
| 2016/0169281 A1 | | 6/2016 | Ertas et al. | |
| 2016/0192534 A1 | | 6/2016 | Pons et al. | |
| 2017/0002747 A1 | | 1/2017 | Fert et al. | |
| 2017/0030651 A1 | | 2/2017 | Rock, Jr. et al. | |
| 2017/0044983 A1 | * | 2/2017 | Duesler | F04D 29/5826 |
| 2017/0089643 A1 | | 3/2017 | Arafat | |

FOREIGN PATENT DOCUMENTS

| | | |
|---|---|---|
| EP | 2620618 A2 | 7/2013 |
| EP | 2783775 A2 | 10/2014 |
| EP | 3012436 A1 | 4/2016 |
| GB | 2521913 A | 7/2015 |
| WO | WO2015/092251 A1 | 6/2015 |

OTHER PUBLICATIONS

Combined Chinese Office Action and Search Report Corresponding to Application No. 201810573726 dated Aug. 18, 2020.

* cited by examiner

ADDITIVELY MANUFACTURED HEAT EXCHANGER

FIELD

The present subject matter relates generally to heat exchangers, and more particularly, to additively manufactured heat exchangers with improved heat transfer capability, structural rigidity, and mounting features.

BACKGROUND

Heat exchangers may be employed in conjunction with gas turbine engines for transferring heat between one or more fluids. For example, a first fluid at a relatively high temperature may be passed through a first passageway, while a second fluid at a relatively low temperature may be passed through a second passageway. The first and second passageways may be in thermal contact or close proximity, allowing heat from the first fluid to be passed to the second fluid. Thus, the temperature of the first fluid may be decreased and the temperature of the second fluid may be increased.

Conventional heat exchangers include a large number of fluid passageways, each fluid passageway being formed using some combination of plates, bar, foils, fins, manifolds, support structures, mounting flanges, etc. Each of these parts must be individually positioned, oriented, and connected to the supporting structure, e.g., via brazing, welding, or another joining method. The manufacturing time and costs associated with the assembly of such a heat exchanger are very high and the likelihood of fluid leaks between the fluid passageways or from the heat exchanger in general is increased due to the number of joints formed. In addition, manufacturing restrictions limit the number, size, and configuration of heat exchanger features and structural components that may be included in the heat exchanger, e.g., within the fluid passageways.

Accordingly, a gas turbine engine with an improved heat exchanger would be useful. More specifically, a heat exchanger for a gas turbine engine that is easier to manufacture and includes features for improved thermal and structural performance would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a heat exchanger for cooling a component is provided. The component includes a cowl at least partially surrounding the component, the cowl defining a peripheral gap and a cowl plenum. The heat exchanger includes a housing defining a heat exchange plenum and a plurality of heat exchange tubes passing through the heat exchange plenum. An inlet manifold defines an inlet plenum in fluid communication with the heat exchange plenum and a discharge manifold defines a discharge plenum in fluid communication with the heat exchange plenum, the discharge manifold being positioned within and bridging the peripheral gap of the component cowl. A fluid outlet is defined by the discharge manifold, the fluid outlet providing fluid communication between the discharge plenum and the cowl plenum. An impingement baffle at least partially defines the discharge manifold and defines an impingement gap between the impingement baffle and the component, the impingement baffle defining a plurality of cooling holes.

In another exemplary aspect of the present disclosure, a method of manufacturing a heat exchanger is provided. The method includes depositing a layer of additive material on a bed of an additive manufacturing machine and selectively directing energy from an energy source onto the layer of additive material to fuse a portion of the additive material and form the heat exchanger for cooling a component. The component includes a cowl at least partially surrounding the component, the cowl defining a peripheral gap and a cowl plenum. The heat exchanger includes a housing defining a heat exchange plenum and a plurality of heat exchange tubes passing through the heat exchange plenum. A discharge manifold defines a discharge plenum in fluid communication with the heat exchange plenum, the discharge manifold being positioned within and bridging the peripheral gap of the component cowl.

In still another exemplary aspect of the present disclosure, an assembly is provided including an annular casing and a cowl assembly spaced apart from the casing to define a cowl gap, the cowl assembly defining a cowl plenum, a plurality of cowl cooling holes providing fluid communication between the cowl plenum and the cowl gap, and a peripheral gap. A heat exchanger is positioned within the peripheral gap of the cowl assembly. The heat exchanger includes a housing defining a heat exchange plenum and a plurality of heat exchange tubes passing through the heat exchange plenum. An inlet manifold defines an inlet plenum in fluid communication with the heat exchange plenum and a discharge manifold defines a discharge plenum in fluid communication with the heat exchange plenum, the discharge manifold being positioned within and bridging the peripheral gap of the component cowl. A fluid outlet is defined by the discharge manifold, the fluid outlet providing fluid communication between the discharge plenum and the cowl plenum. An impingement baffle at least partially defines the discharge manifold and defines an impingement gap between the impingement baffle and the component, the impingement baffle defining a plurality of cooling holes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
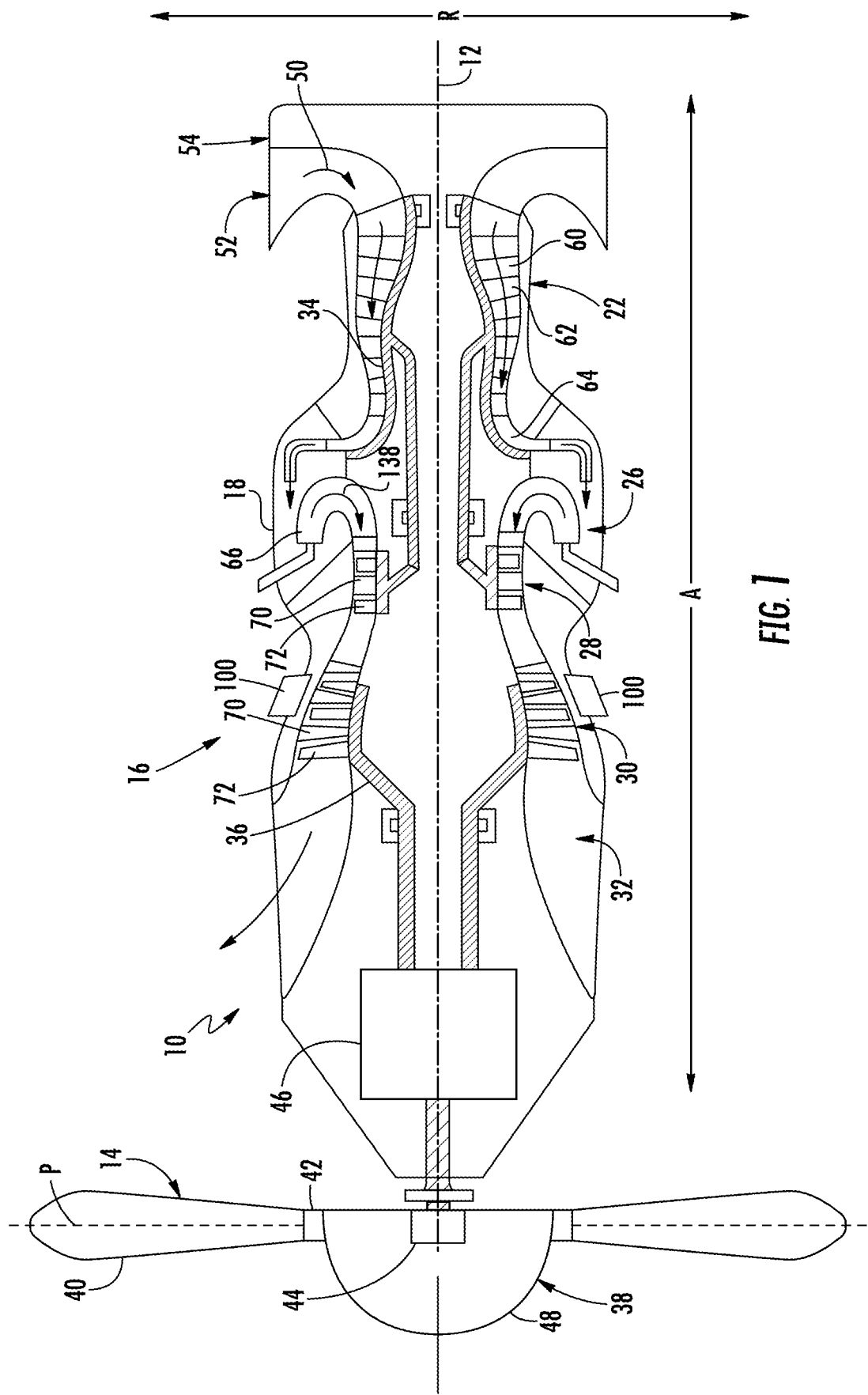
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

The present disclosure is generally directed to a heat exchanger for cooling a component that is coupled with a cowl at least partially surrounding the component. The cowl defines a cowl plenum and a peripheral gap for receiving the heat exchanger. The heat exchanger includes a housing defining a heat exchange plenum for receiving a cool fluid stream and a plurality of heat exchange tubes passing through the heat exchange plenum for receiving a hot fluid stream. A discharge manifold defines a discharge plenum that provides fluid communication between the heat exchange plenum and the cowl plenum through a fluid outlet. In addition, an impingement baffle at least partially defines the discharge manifold and defines a plurality of cooling holes for impinging cooling air on the component proximate the heat exchanger.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a reverse flow turboprop engine 10, referred to herein as "turboprop engine 10." As shown in FIG. 1, turboprop engine 10 defines an axial direction A (extending parallel to a longitudinal centerline or central axis 12 provided for reference), a radial direction R, and a circumferential direction C (not shown) disposed about the axial direction A. Turboprop engine 10 generally includes a fan section 14 and a core turbine engine 16 disposed downstream from the fan section 14, the fan section 14 being operable with, and driven by, core turbine engine 16.

The exemplary core turbine engine 16 depicted generally includes a substantially tubular outer casing 18 extending generally along axial direction A. Outer casing 18 generally encloses core turbine engine 16 and may be formed from a single casing or multiple casings. Core turbine engine 16 includes, in a serial flow relationship, a compressor 22, a combustion section 26, an HP turbine 28, an LP turbine 30, and an exhaust section 32. An air flow path generally extends through compressor 22, combustion section 26, HP turbine 28, LP turbine 30, and exhaust section 32 which are in fluid communication with each other.

A high pressure (HP) shaft or spool 34 drivingly connects the HP turbine 28 to the compressor 22. A low pressure (LP) shaft or spool 36 drivingly connects the LP turbine 30 to fan section 14 of the turboprop engine 10. For the embodiment depicted, fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems. Disk 42 is covered by a rotatable front hub 48 aerodynamically contoured to promote an airflow through the plurality of fan blades 40.

During operation of the turboprop engine 10, a volume of air 50 passes through blades 40 of fan 38 and is urged toward an annular inlet 52 of core turbine engine 16. More specifically, turboprop engine 10 includes an inlet body 54 that defines annular inlet 52 that routes an inlet portion of the flow of air 50 from inlet 52 downstream to compressor 22. Compressor 22 includes one or more sequential stages of compressor stator vanes 60, one or more sequential stages of compressor rotor blades 62, and an impeller 64. The one or more sequential stages of compressor stator vanes 60 are coupled to the outer casing 18 and compressor rotor blades 62 are coupled to HP shaft 34 to progressively compress the flow of air 50. Impeller 64 further compresses air 50 and directs the compressed air 50 into combustion section 26 where air 50 mixes with fuel. Combustion section 26 includes a combustor 66 which combusts the air/fuel mixture to provide combustion gases 68.

Combustion gases 68 flow through HP turbine 28 which includes one or more sequential stages of turbine stator vanes 70 and one or more sequential stages of turbine blades 72. The one or more sequential stages of turbine stator vanes 70 are coupled to the outer casing 18 and turbine blades 72 are coupled to HP shaft 34 extract thermal and/or kinetic energy therefrom. Combustion gases 68 subsequently flow through LP turbine 30, where an additional amount of energy is extracted through additional stages of turbine stator vanes 70 and turbine blades 72 coupled to LP shaft 36. The energy extraction from HP turbine 28 supports operation of compressor 22 through HP shaft 34 and the energy extraction from LP turbine 30 supports operation of fan section 14 through LP shaft 36. Combustion gases 68 exit turboprop engine 10 through exhaust section 32.

It should be appreciated that the exemplary turboprop engine 10 depicted in FIG. 1 is by way of example only and that in other exemplary embodiments, turboprop engine 10 may have any other suitable configuration. For example, it should be appreciated that in other exemplary embodiments, turboprop engine 10 may instead be configured as any other suitable turbine engine, such as a turbofan engine, turbojet engine, internal combustion engine, etc. Furthermore, although turboprop engine 10 described above is an aeronautical gas turbine engine for use in a fixed-wing or rotor aircraft, in other exemplary embodiments, turboprop engine 10 may be configured as any suitable type of gas turbine engine that used in any number of applications, such as a land-based, industrial gas turbine engine, or an aeroderivative gas turbine engine.

In addition, in other exemplary embodiments, the turbine engine may include any suitable number of compressors, turbines, shafts, etc. For example, as will be appreciated, HP shaft 34 and LP shaft 36 may further be coupled to any suitable device for any suitable purpose. For example, in certain exemplary embodiments, turboprop engine 10 of FIG. 1 may be utilized to drive a propeller of a helicopter, may be utilized in aeroderivative applications, or may be attached to a propeller for an airplane. Additionally, in other exemplary embodiments, turboprop engine 10 may include any other suitable type of combustor, and may not include the exemplary reverse flow combustor depicted.

Figure 2:
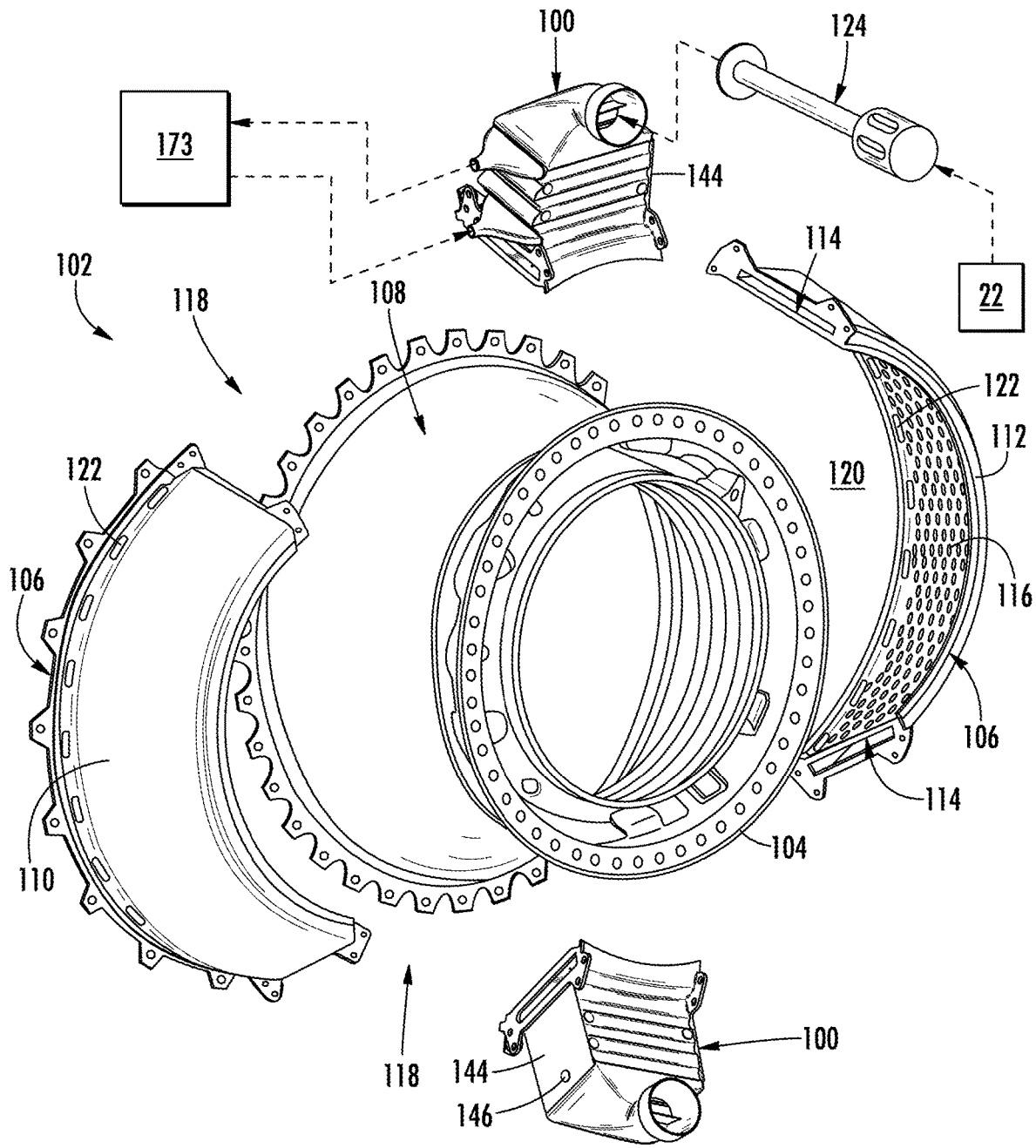
FIG. 2 provides an exploded, perspective view of a power turbine assembly and an additively manufactured heat exchanger that may be used in the exemplary gas turbine engine of FIG. 1 according to an exemplary embodiment of the present subject matter.

Referring still to FIG. 1, turboprop engine 10 may include one or more heat exchangers 100. For example, heat exchanger 100 may be used to transfer heat between two or more fluids in any suitable application. For example, as discussed below, heat exchanger 100 is configured for using a stream of cooling air to cool hot air from a B-sump heat exchanger as well as to cool a component casing. More specifically, cooling air may be used to cool HP turbine 28 and/or LP turbine 30 casings, which are referred to generally as a power turbine assembly 102, an exemplary embodiment of which is illustrated in FIG. 2.

However, it should be appreciated that heat exchanger 100 can be configured for receiving any suitable number and type of fluids for use in a heat transfer process, examples of which are described herein. Moreover, heat exchanger 100 may be placed at any other suitable location within turboprop engine 10 for harnessing fluid temperature differentials for heat transfer. Although the description below refers to the construction of heat exchanger 100, it should be appreciated that heat exchanger 100 is used only for the purpose of explaining aspects of the present subject matter. Indeed, aspects of the present subject matter may be applied to form heat exchangers used in automotive, aviation, maritime, and other industries to assist in heat transfer between fluids.

In general, the exemplary embodiments of heat exchanger 100 described herein may be manufactured or formed using any suitable process. However, in accordance with several aspects of the present subject matter, heat exchanger 100 may be formed using an additive-manufacturing process, such as a 3-D printing process. The use of such a process may allow heat exchanger 100 to be formed integrally, as a single monolithic component, or as any suitable number of sub-components. In particular, the manufacturing process may allow heat exchanger 100 to be integrally formed and include a variety of features not possible when using prior manufacturing methods. For example, the additive manufacturing methods described herein enable the manufacture of heat exchangers having various features, configurations, thicknesses, materials, densities, fluid passageways, and mounting structures not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral mounting features. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved heat transfer efficiency and reliability.

Referring now to FIG. 2, a power turbine assembly 102 including heat exchangers 100 is described according to an exemplary embodiment of the present subject matter. More specifically, FIG. 2 provides an exploded view of power turbine assembly 102 to illustrate various components of power turbine assembly 102. However, it should be appreciated that portions of heat exchanger 100 and power turbine assembly 102 are not illustrated in FIG. 2. Furthermore, it should be appreciated that FIG. 2 provides only one exemplary configuration of heat exchanger 100 and power turbine assembly 102 for the purpose of explaining aspects of the present subject matter and is not intended to be limiting.

According to the illustrated exemplary embodiment, power turbine assembly 102 generally includes an annular turbine casing 104 that surrounds the working components of HP turbine 28 and LP turbine 30, e.g., turbine stator vanes 70 and rotor blades 72. Notably during operation of turboprop engine 10, turbine casing 104 may experience very high temperatures, e.g., due to combustion gases being routed within. To facilitate cooling of turbine casing 104, power turbine assembly 102 further includes a cowl 106 that surrounds turbine casing 104 and provides cooling air onto an outer surface 108 of turbine casing 104, as described below.

As illustrated, cowl 106 includes a first half 110 and a second half 112, each of which define a cowl plenum 114. In addition, a plurality of cooling holes 116 are defined on a radially inner surface of first half 110 and second half 112 of cowl 106. As described in detail below, first half 110 and second half 112 of cowl 106 are joined together using two heat exchangers 100. More specifically, first half 110 and second half 112 define peripheral gaps 118 which are bridged by one or more heat exchangers 100. When assembled, first half 110, second half 112, and heat exchangers 100 at least partially surround turbine casing 104 and define an impingement gap 120 between turbine casing and cowl 106 along the radial direction R.

Heat exchangers 100 provide fluid communication between the respective cowl plenums 114 to define a single annular plenum through which cooling air may be distributed prior to passing through cooling holes 116. The flow of cooling air is directed into impingement gap 120 such that it impinges on the outer surface 108 of turbine casing 104. In this manner, the temperature of turbine casing 104 and power turbine assembly 102 may be regulated. Cowl 106 further defines a plurality of circumferentially spaced cowl discharge ports 122, e.g., providing fluid communication between impingement gap 120 and the ambient environment to allow cooling air to pass out of impingement gap 120 and permit fresh cooling air to flow into impingement gap 120 and impinge on outer surface 108 of turbine casing 104.

According to exemplary embodiments of the present subject matter, cooling air may be supplied to cowl plenum 114 through heat exchanger 100 from any suitable source. As illustrated schematically in FIG. 2, cooling air is supplied to cowl plenum 114 through heat exchangers 100 by an ejector assembly 124. Ejector assembly 124 is configured for passing a flow of bleed air from compressor 22 of turboprop engine 10 through ejector assembly 124 to entrain ambient air, e.g., from atmosphere or within outer casing 18 of turboprop engine 10. In this manner, a mixture of bleed air and ambient air is passed through heat exchanger 100. It should be appreciated that the cooling arrangement described above for power turbine assembly 102 is only one exemplary cooling arrangement. Other components, features, and configurations are possible and remain within the scope of the present subject matter.

Referring now generally to FIGS. 3 through 11, heat exchanger 100 will be described according to an exemplary embodiment of the present subject matter. As illustrated, heat exchanger 100 includes a housing 130 that extends between a left side 132 and a right side 134 along a first direction, e.g., the lateral direction L. In addition, housing 130 also extends between a bottom side 136 and a top side 138 along a second direction, e.g., the vertical direction V. Housing 130 extends between a front side 140 and a back side 142 along a third direction, e.g., the transverse direction T. According to the illustrated embodiment, the lateral direction L, the vertical direction V, and the transverse direction T are mutually perpendicular with one another, such that an orthogonal coordinate system is generally defined.

However, it should be appreciated that the exemplary heat exchanger 100 and the L-V-T coordinate system are used herein only for the purpose of explaining aspects of the present subject matter and are not intended to limit the scope of the present disclosure. In this regard, directional indicators such as "left" and "right," "top" and "bottom," and "front" and "back" are only used to indicate the relative positioning of various parts of heat exchanger 100 along the L-direction, the V-direction, and the T-direction, respectively.

According to the illustrated embodiment, housing 130 generally includes a plurality of walls 150 that define a heat exchange plenum 152. More specifically, housing 130 includes four walls 150 that extend substantially along the vertical direction V. According to an exemplary embodiment of the present subject matter, heat exchanger 100 may further include a back plate 144 attached to one side of housing 130. For example, as illustrated in FIG. 2, back plate 144 is attached to left side 132 of housing 130. More specifically, back plate 144 is attached using a pin 146 that is received in a pin aperture 148 (see FIG. 3, where back plate 144 is removed for clarity) defined in left side 132 of housing 130. Back plate 144 is generally configured to perform a sealing function while avoiding stresses due to the different thermal expansion between heat exchange tubes 170 (described below) and walls 150 of housing 130. Pin 146 allow back plate 144 to move along the lateral direction L while maintaining alignment and sealing left side 132 of housing.

Figure 4:
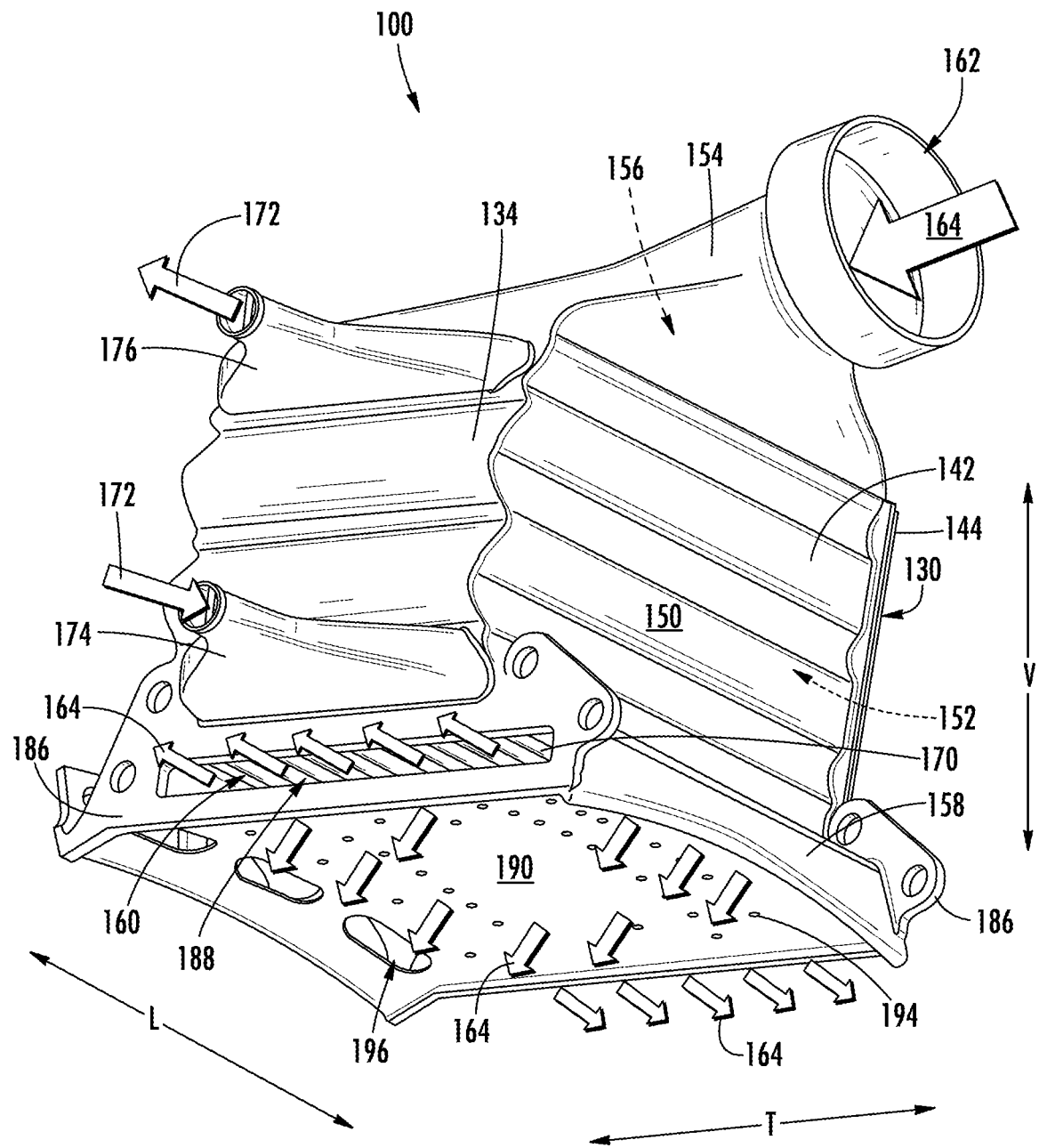
FIG. 4 provides another perspective view of the exemplary heat exchanger of FIG. 2 according to an exemplary embodiment of the present subject matter.

Heat exchanger 100 further includes an inlet manifold 154 defining an inlet plenum 156 and a discharge manifold 158 defining a discharge plenum 160. As illustrated, walls 150 extend between inlet manifold 154 and discharge manifold 158 such that inlet plenum 156 is in fluid communication with the heat exchange plenum 152 and heat exchange plenum 152 is in fluid communication with discharge plenum 160. In this manner, inlet plenum 156, heat exchange plenum 152, and discharge plenum 160 extend substantially along the vertical direction V to define a cooling air flow path between a cooling air inlet 162 and discharge plenum 160. As illustrated in FIG. 4, a stream of cooling air (indicated by arrows 164), e.g., from ejector assembly 124, passes through heat exchanger 100 along the cooling air flow path.

Referring now also to FIGS. 6 through 10, heat exchanger 100 further includes a plurality of heat exchange tubes 170 passing through the heat exchange plenum 152. For example, heat exchange tubes 170 are illustrated as passing through heat exchange plenum 152 substantially along a second direction perpendicular to the first direction, e.g., along the lateral direction L. Heat exchange tubes 170 are generally configured for receiving a stream of hot air (indicated by arrows 172 in FIG. 4). Hot air may be in fluid communication with another heat exchanger within turboprop engine 10, e.g., with a B-sump heat exchanger 173 (FIG. 2) used to cool the B-sump of turboprop engine 10. Therefore, according to the illustrated embodiment, heat exchanger 100 is an air-air heat exchanger configured for receiving a cool air stream 164 within the heat exchanger plenum 152 and a hot air stream 172 within the plurality of heat exchange tubes 170. However, it should be appreciated that heat exchanger 100 could alternatively be used to exchange thermal energy between any two or more fluids for any suitable purpose.

Heat exchange tubes 170 may be in fluid communication with a hot fluid supply through a tube inlet manifold 174 and a tube outlet manifold 176, each of which may be formed in a manner similar to that described herein related to inlet manifold 154. As illustrated, heat exchange tubes 170 pass through heat exchange plenum 152 in a serpentine pattern along the vertical direction starting from a first side, e.g., bottom side 136 of housing 130 proximate discharge manifold 158 and winding toward a second side, e.g., top side 138 of housing 130 proximate inlet manifold 154. In this manner, hot air 172 makes multiple passes in a cross-flow arrangement with cooling air 164.

Figure 5:
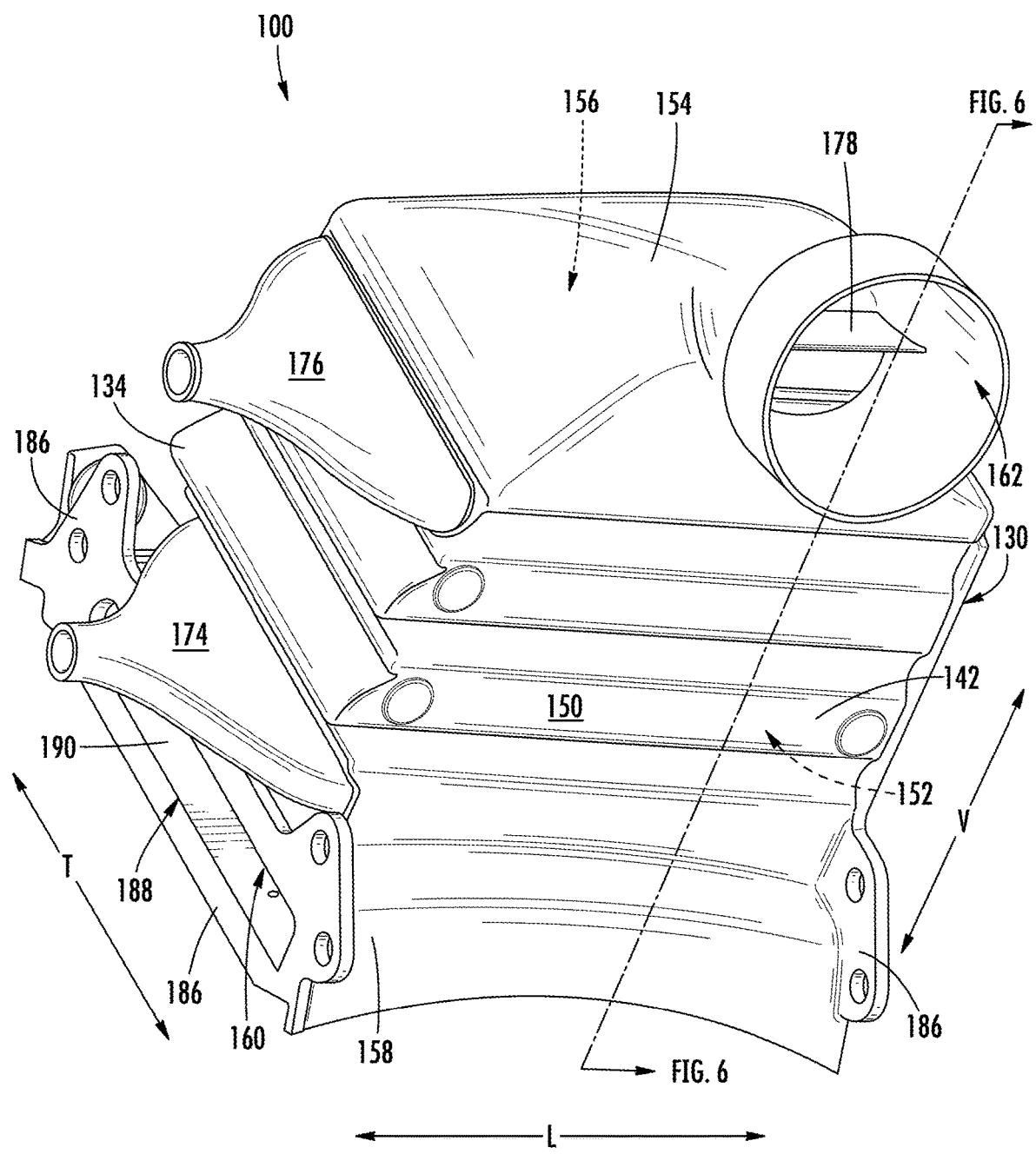
FIG. 5 provides another perspective view of the exemplary heat exchanger of FIG. 2 according to an exemplary embodiment of the present subject matter.
Figure 6:
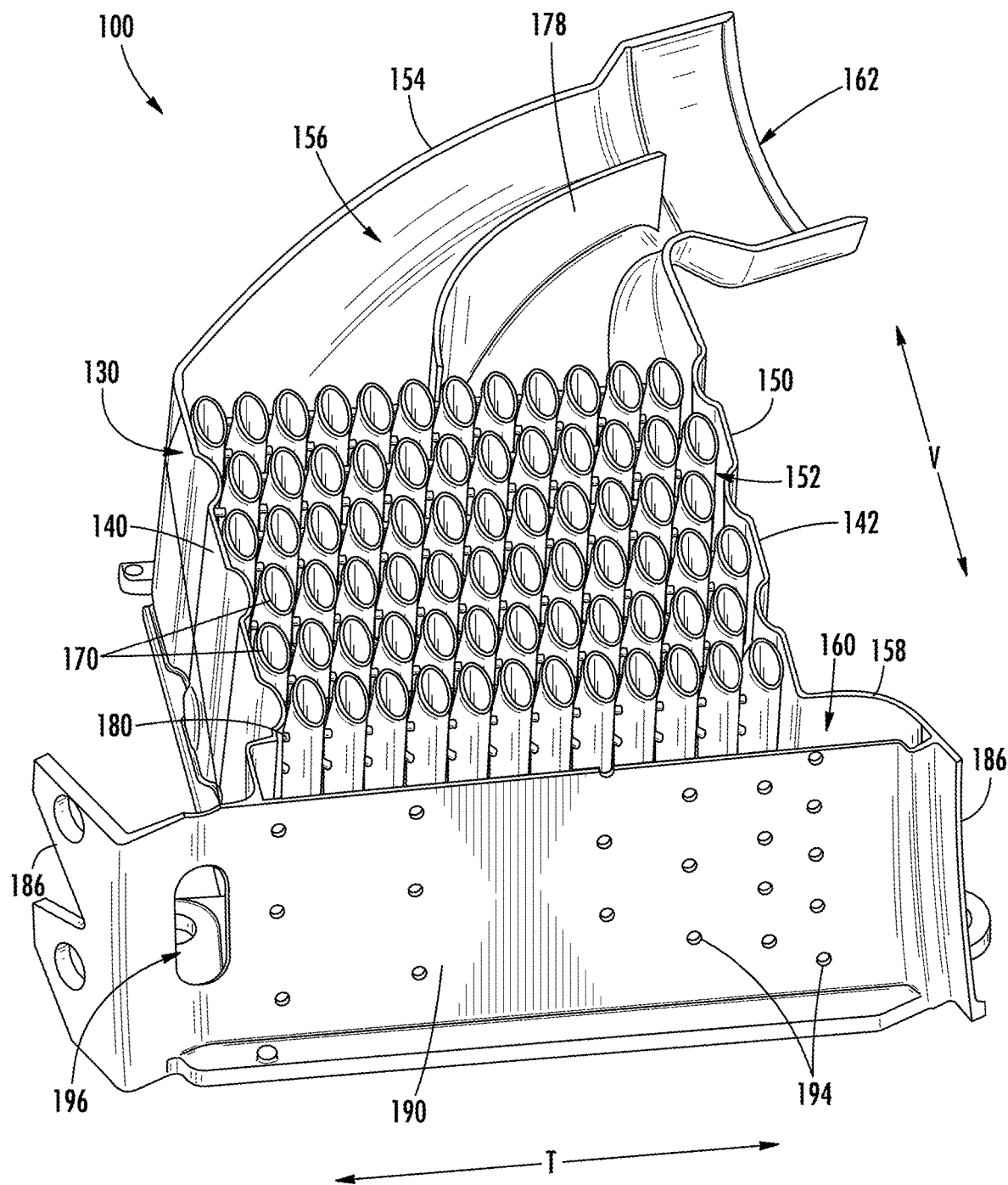
FIG. 6 provides a cross-sectional view of the exemplary heat exchanger of FIG. 2, taken along Line 6-6 of FIG. 5.
Figure 7:
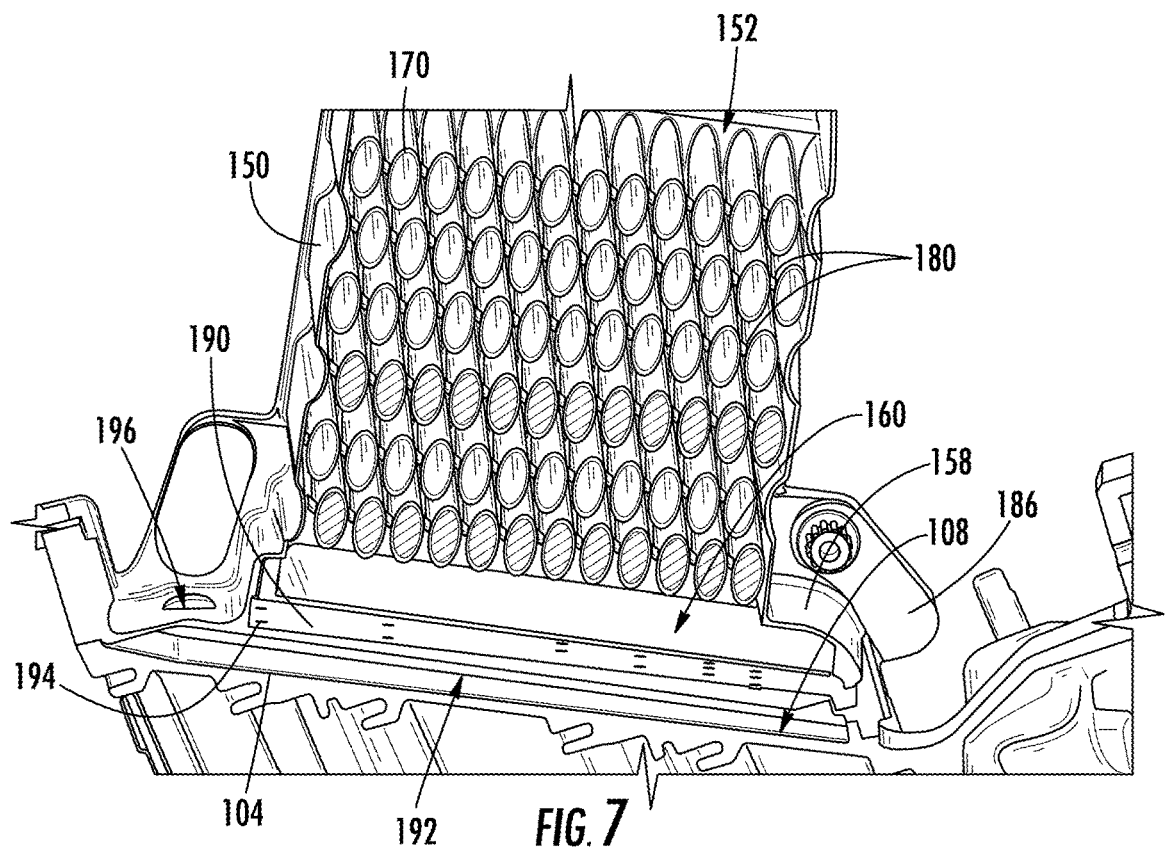
FIG. 7 provides another cross-sectional view of the exemplary heat exchanger of FIG. 2.

Heat exchanger 100 may define various features for improving the flow of cooling air 164 or other fluids with heat exchanger 100, the heat transfer efficiency of heat exchanger 100, the structural rigidity of heat exchanger 100, etc. For example, as best illustrated in FIGS. 5 and 6, heat exchanger 100 includes one or more flow splitters 178 positioned within the various fluid inlets and outlets for splitting or merging the flows of heat exchange fluid as desired. For example, using inlet manifold 154 as an example, one or more flow splitters 178 are positioned within inlet plenum 156 and extend between cooling air inlet 162 and the top of heat exchanger plenum 152 proximate heat exchange tubes 170. Flow splitters 178 may be formed in any suitable size, number, spacing, shape, and orientation as needed depending on the application and the type of heat exchange fluid.

Figure 9:
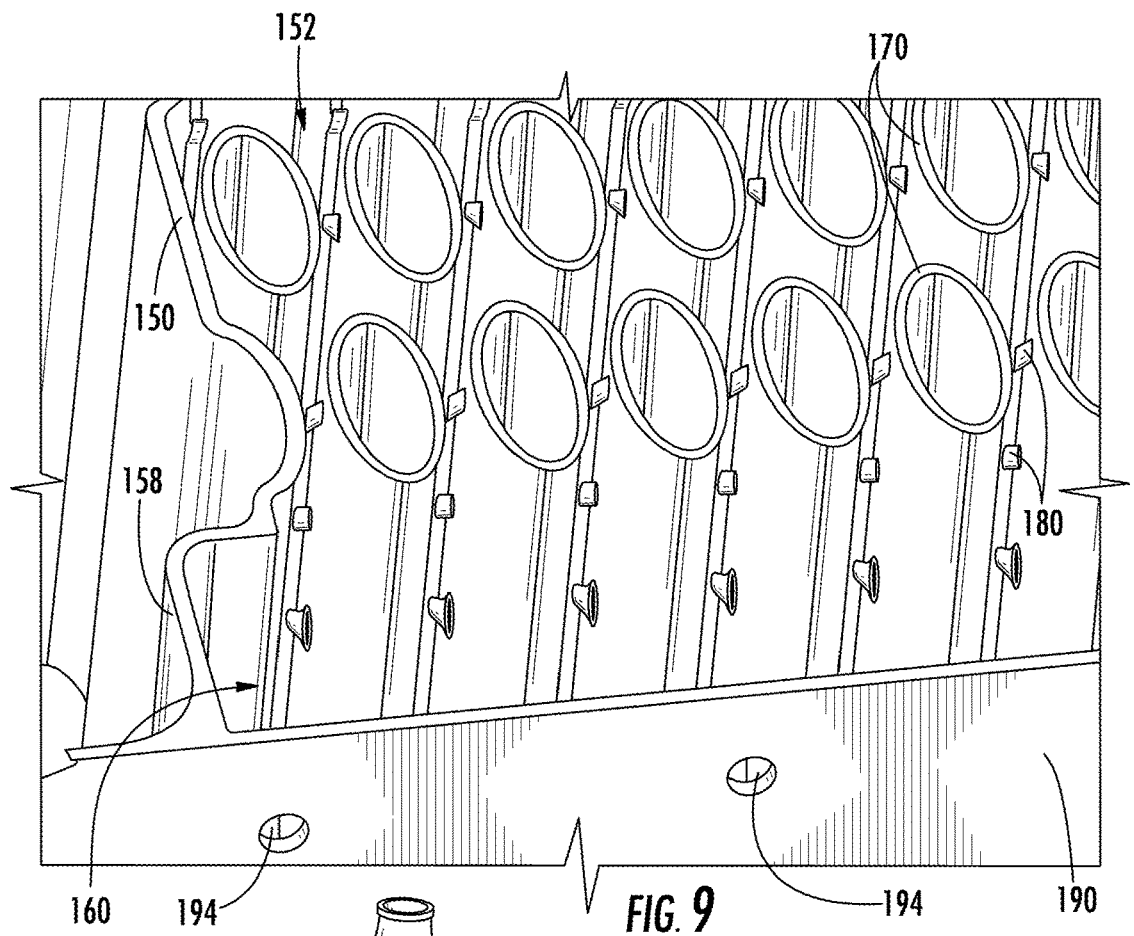
FIG. 9 provides another cross-sectional view of the exemplary heat exchanger of FIG. 2.
Figure 10:
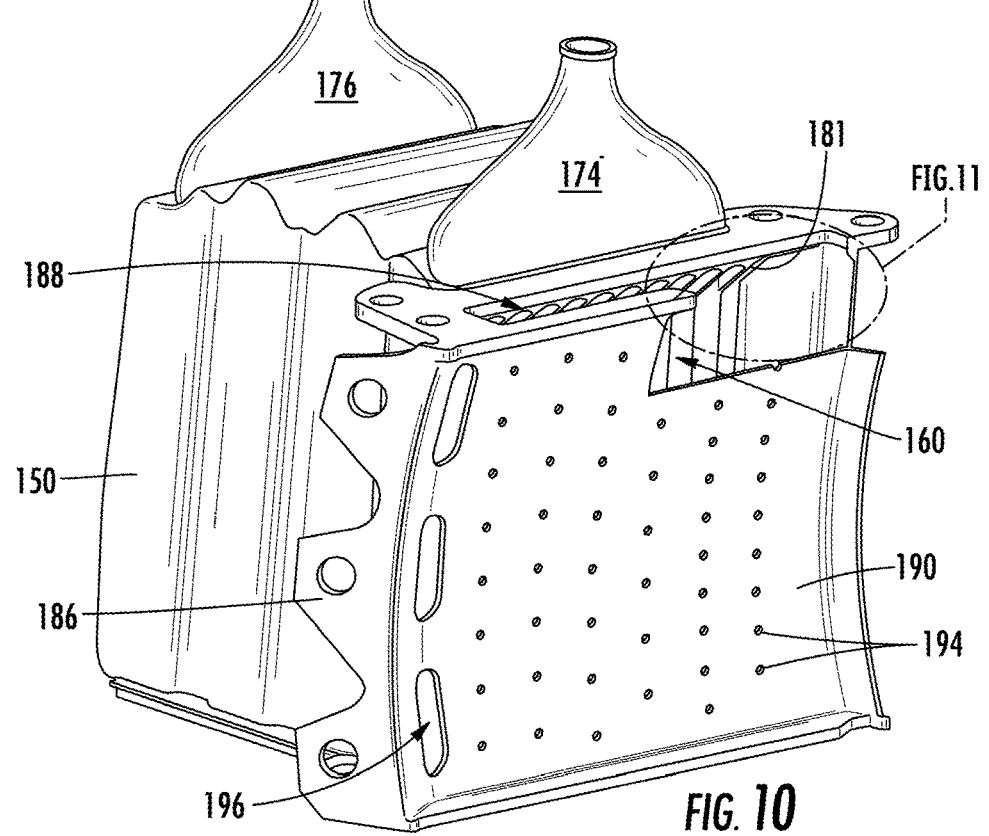
FIG. 10 provides a partial perspective view of the exemplary heat exchanger of FIG. 2.
Figure 11:
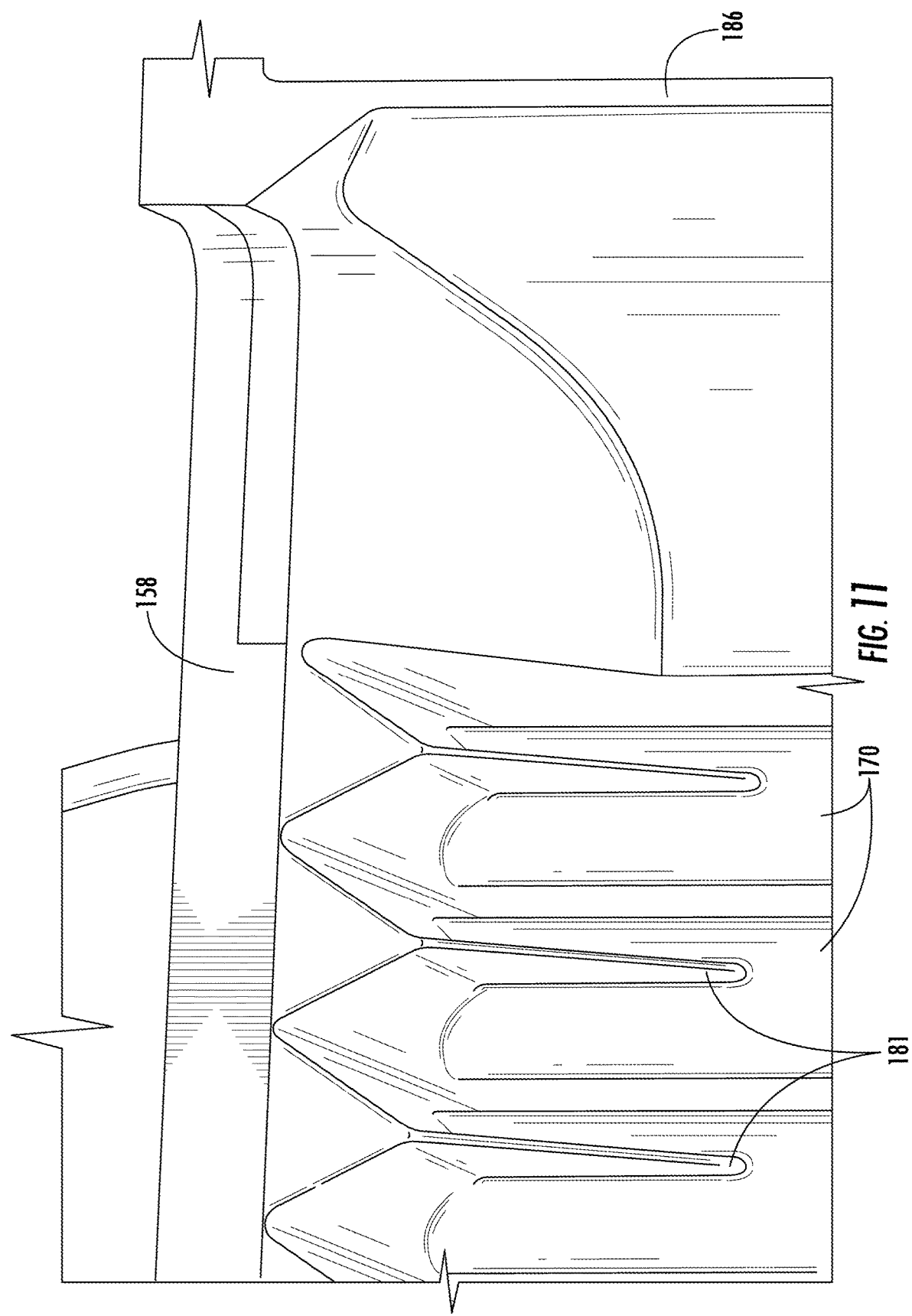
FIG. 11 provides a close-up view of structural supports of the exemplary heat exchanger of FIG. 2 according to an exemplary embodiment of the present subject matter.

In addition, as best illustrated in FIGS. 6 and 9, heat exchanger 100 may include one or more support struts 180 extending between and connecting adjacent tubes 170 of the plurality of heat exchange tubes 170. Support struts 180 may provide additional structural rigidity to heat exchange tubes 170 and improve the frequency response of heat exchanger 100. Similarly, referring briefly to FIGS. 10 and 11, discharge manifold 158 defines a plurality of support ribs 181 for increasing the structural rigidity of heat exchanger 100 and decreasing the stagnation of fluid flow within discharge plenum 160. It should be appreciated that the additive manufacturing techniques discussed herein enable the formation of any other suitable support structures or members throughout heat exchanger 100.

In addition, walls 150 of housing 130 can be contoured to ensure a consistent flow path of cooling air 164. For example, as illustrated in FIG. 6, walls 150 may be contoured to mirror adjacent heat exchange tubes 170 and maintain a substantially constant gap between wall 150 and heat exchange tubes 170 within heat exchange plenum 152. In other words, for example, if the adjacent rows of heat exchange tubes 170 are offset relative to each other, walls 150 may protrude or be recessed to simulate an additional heat exchange tube 170 and maintain a constant flow of cooling air 164.

Figure 8:
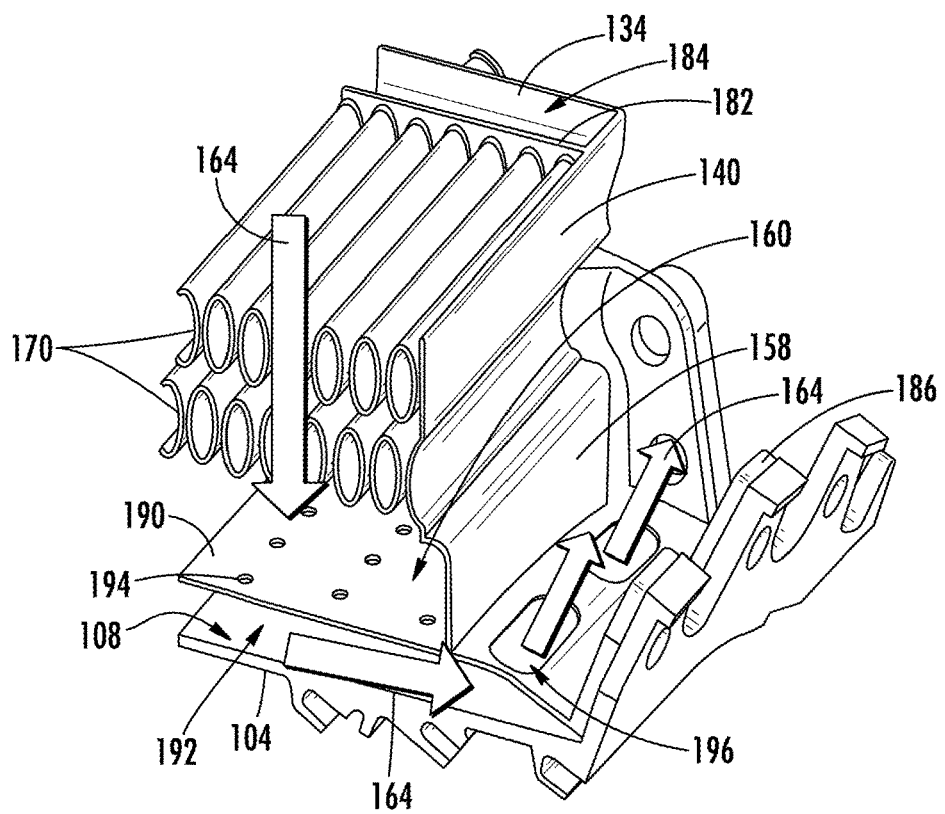
FIG. 8 provides another cross-sectional view of the exemplary heat exchanger of FIG. 2.

Notably, heat exchange tubes 170 are illustrated as passing back and forth along the lateral direction L. As illustrated in FIG. 8, housing 130 may further define a plurality of collector manifolds 182 that define collector plenums 184 for providing fluid communication between vertically adjacent rows of heat exchange tubes 170. In this manner, fluid from a row of heat exchange tubes 170 will pass into a collector plenum 184 where it is mixed before passing back through the adjacent row of heat exchange tubes. Such a configuration ensures even temperature distribution within a given row of heat exchange tubes 170.

Although heat exchange tubes 170 are illustrated as being straight tubes routed in a serpentine manner, it should be appreciated that according to alternative embodiments, each heat exchange tube 170 may be curvilinear, serpentine, helical, sinusoidal, or any other suitable shape. In addition, heat exchange tubes 170 may be formed in any suitable size, number, spacing, shape, orientation, and number of passes as needed depending on the application and the type of heat exchange fluid. These various configurations are enabled by the additive manufacturing processes disclosed herein and are considered to be within the scope of the present subject matter.

Figure 3:
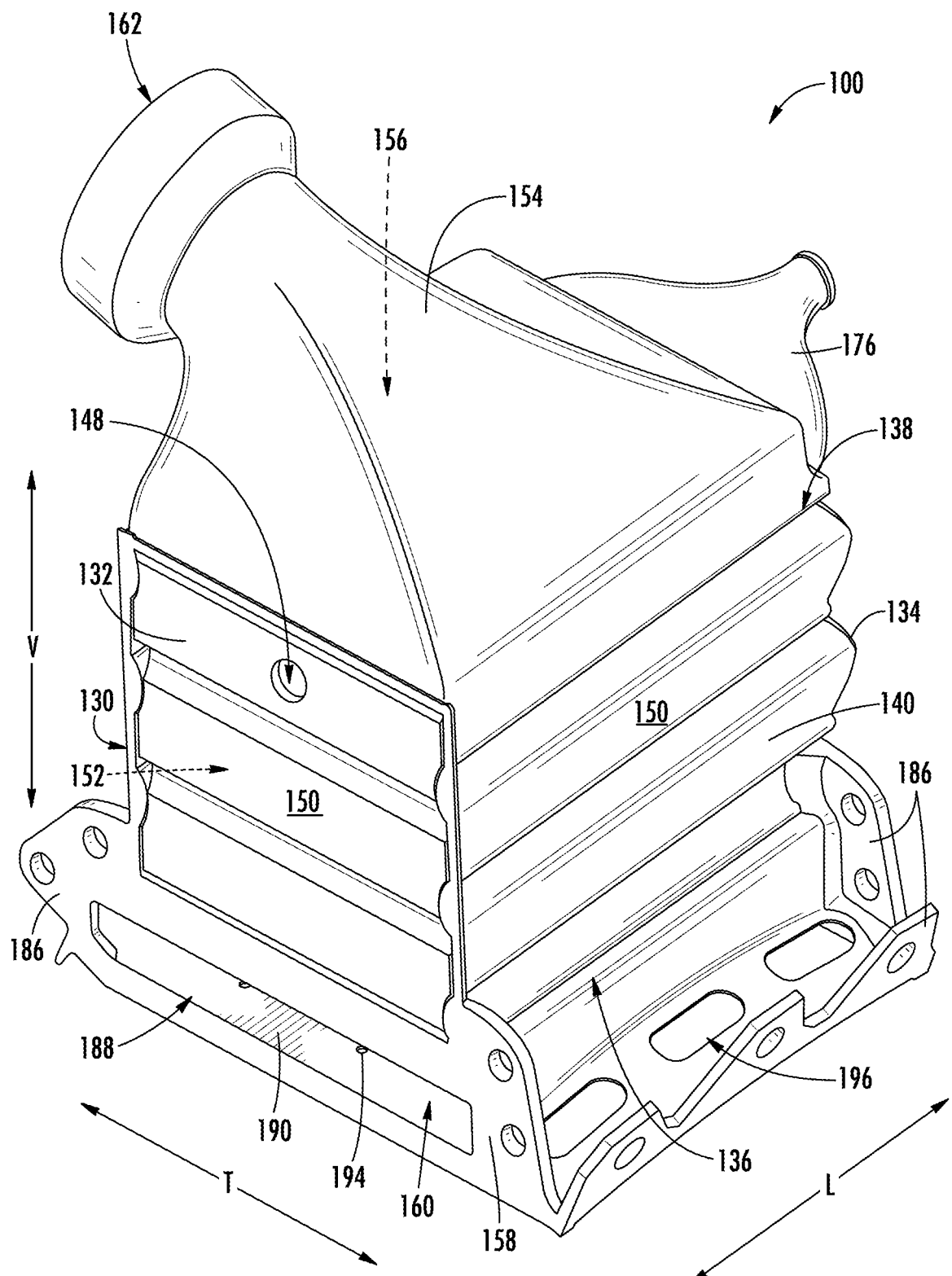
FIG. 3 provides a perspective view of the exemplary heat exchanger of FIG. 2 according to an exemplary embodiment of the present subject matter.

As illustrated schematically in FIG. 2, heat exchanger 100 is positioned within peripheral gap 118 of cowl 106. More specifically, discharge manifold 158 of heat exchanger 100 defines various features for interfacing with cowl 106 such that discharge manifold 158 is positioned within and bridges peripheral gap 118 of cowl 106. Discharge manifold 158 defines a plurality of mounting flanges 186 that are used to join first half 110 and second half 112 of cowl 106 as well as to join heat exchanger 100 to turbine casing 104, e.g., using any suitable mechanical fastener. It should be appreciated that flanges 186 are removable or not needed according to alternative exemplary embodiments. For example, according to one embodiment, flanges 186 are used only to attached heat exchanger 100 to first half 110 and second half 112 of cowl 106, but not to turbine casing 104. As best illustrated in FIGS. 3 and 4, circumferentially spaced flanges 186 that are coupled to first half 110 and second half 112 of cowl 106 define fluid outlets 188. Fluid outlets 188 provide fluid communication between discharge plenum 160 and cowl plenum 114 to distribute cooling air 164 circumferentially throughout cowl plenum 114.

As best illustrated in FIGS. 4, 6, and 8, an impingement baffle 190 at least partially defines discharge manifold 158. In this manner, impingement baffle 190 is positioned between heat exchange tubes 170 and turbine casing 104 to define an impingement gap 192 (similar to impingement gap 120) between impingement baffle 190 and turbine casing 104. Impingement baffle 190 further defines a plurality of cooling holes 194 for urging a flow of impingement cooling air 164 onto turbine casing 104 on which heat exchanger 100 is mounted. In addition, discharge manifold 158 defines one or more exhaust ports 196 (similar to cowl discharge ports 122) that provided fluid communication between impingement gap 192 and an ambient environment, e.g., the area within casing 18 of turboprop engine 10. In this manner, fresh cooling air 164 may be continuously circulated through impingement gap 192 for cooling turbine casing 104.

The various portions of heat exchanger 100 may be constructed using any suitable material, in any suitable geometry, density, and thickness, as needed to provide necessary structural support to heat exchanger 100. For example, housing 130 of heat exchanger 100 may be formed from a rigid, thermally insulating material. In addition, housing 130 may be thicker and denser to provide structural support for loads experienced by heat exchanger 100 during mounting, assembly, and operation of a turboprop engine 10. By contrast, heat exchange tubes 170 may be thinner and constructed of a more thermally conductive material in order to enhance heat transfer. For example, heat exchange tubes 170 may have a wall thickness of 20 μm or any other suitable thickness.

It should be appreciated that heat exchanger 100 is described herein only for the purpose of explaining aspects of the present subject matter. For example, heat exchanger 100 will be used herein to describe exemplary configurations, constructions, and methods of manufacturing heat exchanger 100. It should be appreciated that the additive manufacturing techniques discussed herein may be used to manufacture other heat exchangers for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of heat exchanger 100 according to an exemplary embodiment of the present subject matter has been presented, an exemplary method 200 for forming a heat exchanger according to an exemplary embodiment of the present subject matter is provided. Method 200 can be used by a manufacturer to form heat exchanger 100, or any other suitable heat exchanger. It should be appreciated that the exemplary method 200 is discussed herein only to describe exemplary aspects of the present subject matter, and is not intended to be limiting.

Figure 12:
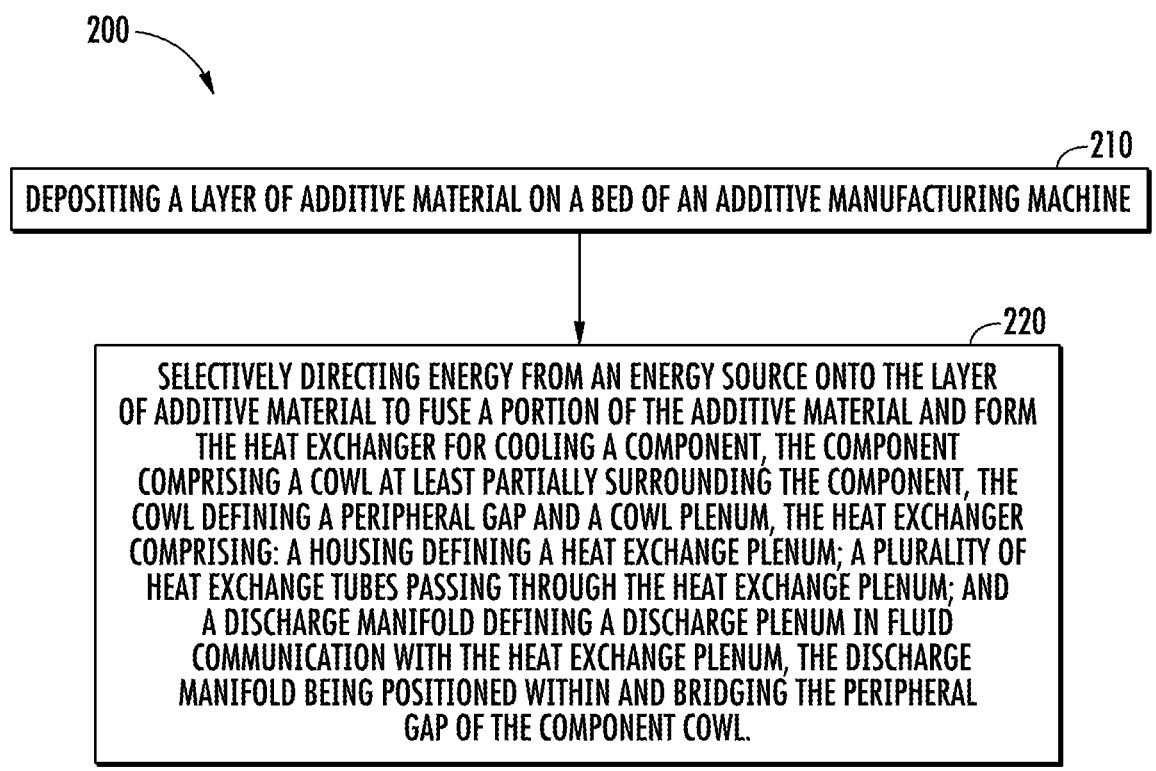
FIG. 12 is a method of manufacturing a heat exchanger according to an exemplary embodiment of the present subject matter.

Referring now to FIG. 12, method 200 includes, at step 210, depositing a layer of additive material on a bed of an additive manufacturing machine. Method 200 further includes, at step 220, selectively directing energy from an energy source onto the layer of additive material to fuse a portion of the additive material and form a heat exchanger for cooling a component. For example, using the example from above, heat exchanger 100 may be formed for cooling turbine casing 104. In this regard, the component includes a cowl at least partially surrounding the component, the cowl defining a peripheral gap and a cowl plenum.

The heat exchanger formed at step 220 may include a housing defining a heat exchange plenum and a plurality of heat exchange tubes passing through the heat exchange plenum. An inlet manifold defines an inlet plenum in fluid communication with the heat exchange plenum and a discharge manifold defines a discharge plenum in fluid communication with the heat exchange plenum, the discharge manifold being positioned within and bridging the peripheral gap of the component cowl. A fluid outlet is defined by the discharge manifold, the fluid outlet providing fluid communication between the discharge plenum and the cowl plenum. An impingement baffle at least partially defines the discharge manifold and defines an impingement gap between the impingement baffle and the component, the impingement baffle defining a plurality of cooling holes. Notably, according to an exemplary embodiment, the housing, the heat exchange tubes, the inlet manifold, the discharge manifold, and the impingement baffle are integrally formed as a single monolithic component.

FIG. 12 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using heat exchanger 100 as an example, it should be appreciated that these methods may be applied to manufacture any suitable heat exchanger.

An additively manufactured heat exchanger and a method for manufacturing that heat exchanger are described above. Notably, heat exchanger 100 may generally include performance-enhancing geometries, heat exchanging features, and mounting structures whose practical implementations are facilitated by an additive manufacturing process, as described below. For example, using the additive manufacturing methods described herein, the heat exchanger may include a heat exchange structure for transferring thermal energy between two streams of air and for providing impingement air onto a component casing. In addition, the additively manufacturing techniques described herein enable the formation of a heat exchanger with integral mounting features which enable the installation of the heat exchanger with a component cowl for providing cooling air throughout the cowl for component cooling. These features may be introduced during the design of the heat exchanger, such that they may be easily integrated into heat exchanger during the build process at little or no additional cost. Moreover, the entire heat exchanger, including the housing, the heat exchange tubes, the inlet manifold, the discharge manifold, the flow splitters, and other features can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An assembly comprising a heat exchanger, a component, and a cowl at least partially surrounding the component, the cowl defining at least one peripheral gap and at least one cowl plenum, the heat exchanger comprising:
   a housing defining a heat exchange plenum for receiving a first heat exchange fluid;
   a plurality of heat exchange tubes passing through the heat exchange plenum, the plurality of heat exchange tubes being fluidly isolated from the heat exchange plenum for receiving a second heat exchange fluid;
   an inlet manifold defining an inlet plenum in fluid communication with the heat exchange plenum for receiving the first heat exchange fluid;
   a discharge manifold defining a discharge plenum in fluid communication with the heat exchange plenum, the discharge manifold being positioned within and bridging the at least one peripheral gap of the cowl;
   a fluid outlet defined by the discharge manifold, the fluid outlet providing fluid communication between the discharge plenum and the at least one cowl plenum; and
   an impingement baffle at least partially defining the discharge manifold and defining an impingement gap between the impingement baffle and the component, the impingement baffle defining a plurality of cooling holes through which the first heat exchange fluid is impinged onto the component.

2. The assembly of claim 1, wherein the discharge manifold defines an exhaust port providing fluid communication between the impingement gap and an ambient environment.

3. The assembly of claim 1, wherein the inlet plenum, the heat exchange plenum, and the discharge plenum extend substantially along a first direction, and wherein the plurality of heat exchange tubes pass through heat exchange plenum substantially along a second direction perpendicular to the first direction.

4. The assembly of claim 3, wherein the heat exchange tubes pass through heat exchange plenum in a serpentine pattern between a first side of the housing proximate the discharge manifold and a second side of the housing proximate the inlet manifold.

5. The assembly of claim 1, wherein the housing comprises a plurality of walls, at least one of the plurality of walls being contoured to maintain a substantially constant gap between the wall and the heat exchange tubes within the heat exchange plenum.

6. The assembly of claim 1, wherein one or more support struts extend between and connect adjacent tubes of the plurality of heat exchange tubes.

7. The assembly of claim 1, wherein the heat exchanger comprises:
one or more flow splitters positioned within the inlet plenum and extending between a cooling air inlet and the plurality of heat exchange tubes.

8. The assembly of claim 1, wherein the component is annular and the cowl is semi-annular and is joined with the heat exchanger to surround the component.

9. The assembly of claim 1, wherein the heat exchanger is a first heat exchanger, the heat exchanger further comprising a second heat exchanger, and wherein the cowl comprises a first half and a second half, the first half and the second half being joined by the first heat exchanger and the second heat exchanger.

10. The assembly of claim 1, wherein the heat exchanger is an air-air heat exchanger configured for receiving a cool air stream within the heat exchanger plenum and a hot air stream within the plurality of heat exchange tubes.

11. The assembly of claim 1, wherein the cowl defines a plurality of cowl cooling holes providing fluid communication between the at least one cowl plenum and a cowl impingement gap defined between the component and the cowl.

12. The assembly of claim 1, wherein the component is a power turbine of a gas turbine engine and the cowl is a power turbine cowl, and wherein the inlet plenum is in fluid communication with an ejector assembly of the gas turbine engine that provides a mixture of bleed air from a compressor section and ambient air, and wherein the heat exchange tubes are in fluid communication with a B-sump heat exchanger of the gas turbine engine.

13. The assembly of claim 1, wherein the heat exchanger comprises a plurality of layers formed by:
depositing a layer of additive material on a bed of an additive manufacturing machine; and
selectively directing energy from an energy source onto the layer of additive material to fuse a portion of the additive material.

14. The assembly of claim 1, wherein the housing, the heat exchange tubes, the inlet manifold, the discharge manifold, and the impingement baffle are integrally formed as a single monolithic component.

15. A method of manufacturing a heat exchanger, the method comprising:
depositing a layer of additive material on a bed of an additive manufacturing machine; and
selectively directing energy from an energy source onto the layer of additive material to fuse a portion of the additive material and form the heat exchanger for cooling a component, and a cowl at least partially surrounding the component, the cowl defining at least one peripheral gap and at least one cowl plenum, the heat exchanger comprising:
a housing defining a heat exchange plenum;
a plurality of heat exchange tubes passing through the heat exchange plenum; and
a discharge manifold defining a discharge plenum in fluid communication with the heat exchange plenum, the discharge manifold being positioned within and bridging the at least one peripheral gap of the cowl;
an inlet manifold defining an inlet plenum in fluid communication with the heat exchange plenum;
a fluid outlet defined by the discharge manifold, the fluid outlet providing fluid communication between the discharge plenum and the at least one cowl plenum; and
an impingement baffle at least partially defining the discharge manifold and defining an impingement gap between the impingement baffle and the component, the impingement baffle defining a plurality of cooling holes.

16. The method of claim 15, wherein the discharge manifold defines an exhaust port providing fluid communication between the impingement gap and an ambient environment.

17. The method of claim 15, wherein the inlet plenum, the heat exchange plenum, and the discharge plenum extend substantially along a first direction, and wherein the plurality of heat exchange tubes pass through heat exchange plenum substantially along a second direction perpendicular to the first direction, and wherein the heat exchange tubes pass through heat exchange plenum in a serpentine pattern between a first side of the housing proximate the discharge manifold and a second side of the housing proximate the inlet manifold.

18. The method of claim 15, further comprising:
forming one or more flow splitters, the one or more flow splitters being positioned within the inlet plenum and extending between a cooling air inlet and the plurality of heat exchange tubes.

19. An assembly comprising:
an annular casing;
a cowl assembly spaced apart from the annular casing to define an impingement gap, the cowl assembly defining a cowl plenum, a plurality of cowl cooling holes providing fluid communication between the cowl plenum and the impingement gap, and a peripheral gap;
a heat exchanger positioned within the peripheral gap of the cowl assembly, the heat exchanger comprising:
a housing defining a heat exchange plenum;
a plurality of heat exchange tubes passing through the heat exchange plenum;
an inlet manifold defining an inlet plenum in fluid communication with the heat exchange plenum;
a discharge manifold defining a discharge plenum in fluid communication with the heat exchange plenum, the discharge manifold being positioned within and bridging the peripheral gap of the cowl assembly;
a fluid outlet defined by the discharge manifold, the fluid outlet providing fluid communication between the discharge plenum and the cowl plenum; and
an impingement baffle at least partially defining the discharge manifold and defining the impingement gap between the impingement baffle and the annular casing, the impingement baffle defining a plurality of cooling holes.

* * * * *